US012810486B2

(12) United States Patent
Vaidyanathan et al.

(10) Patent No.: US 12,810,486 B2
(45) Date of Patent: Nov. 24, 2026

(54) COMPRESSION OF TEXTURE SETS USING A NON-LINEAR FUNCTION AND QUANTIZATION

(71) Applicant: NVIDIA Corporation, Santa Clara, CA (US)

(72) Inventors: Karthik Vaidyanathan, Oakland, CA (US); Marco Salvi, Seattle, WA (US); Bartlomiej Wronski, Brooklyn, NY (US); Tomas Akenine-Moller, Lund (SE); Johan Pontus Ebelin, Lund (SE); Aaron Eliot Lefohn, Kirkland, WA (US); John Matthew Burgess, Austin, TX (US); Steven James Heinrich, Madison, AL (US); Michael Alan Fetterman, Lancaster, MA (US); Shirish Gadre, Fremont, CA (US); Mark Alan Gebhart, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 198 days.

(21) Appl. No.: 18/420,625

(22) Filed: Jan. 23, 2024

(65) Prior Publication Data

US 2024/0257405 A1 Aug. 1, 2024

Related U.S. Application Data

(60) Provisional application No. 63/441,720, filed on Jan. 27, 2023.

(51) Int. Cl.
*G06T 9/00* (2006.01)

(52) U.S. Cl.
CPC .............. *G06T 9/002* (2013.01); *G06T 9/001* (2013.01)

(58) Field of Classification Search
CPC ... G06T 9/001–40; G06T 15/04; H04N 19/91; H04N 19/503; H04N 19/159;
(Continued)

(56) References Cited

U.S. PATENT DOCUMENTS

2011/0032251 A1* 2/2011 Pothana .................. G06T 15/04 345/419
2013/0229422 A1 9/2013 Harris et al.
(Continued)

OTHER PUBLICATIONS

Wronski, Bart. "Dimensionality Reduction for Image and Texture Set Compression." Bart Wronski, May 30, 2020, bartwronski.com/2020/05/21/dimensionality-reduction-for-image-and-texture-set-compression/. (Year: 2020).*
(Continued)

*Primary Examiner* — Gregory A Morse
*Assistant Examiner* — Stefano Anthony Dardano
(74) *Attorney, Agent, or Firm* — Zilka-Kotab, P.C.

(57) ABSTRACT

In computer graphics, texture refers to a type of surface, including the material characteristics, that can be applied to an object in an image. A texture may be defined using numerous parameters, such as color(s), roughness, glossiness, etc. In some implementations, a texture may be represented as an image that can be placed on a three-dimensional (3D) model of an object to give surface details to the 3D object. To reduce a size of textures (e.g. for storage and transmission), the present disclosure provides, in one embodiment, for compression of a texture set using a non-linear function and quantization. In another embodiment, the disclosure provides for compression of one or more textures using a non-linear function configured to compress textures with an arbitrary number of channels and/or an arbitrary ordering of channels.

42 Claims, 12 Drawing Sheets

(58) Field of Classification Search
CPC ...... H04N 19/90; H04N 19/593; H04N 19/61; H04N 19/13
See application file for complete search history.

(56) References Cited

U.S. PATENT DOCUMENTS

| | | | |
|---|---|---|---|
| 2019/0251734 | A1* | 8/2019 | Li ........................ H04N 13/161 |
| 2019/0304140 | A1 | 10/2019 | Fuller et al. |
| 2020/0051287 | A1 | 2/2020 | Wihlidal |
| 2022/0392140 | A1 | 12/2022 | Akenine-Moller et al. |
| 2024/0378759 | A1 | 11/2024 | Vaidyanathan et al. |
| 2024/0378792 | A1 | 11/2024 | Vaidyanathan et al. |
| 2025/0272783 | A1* | 8/2025 | Farhadzadeh ......... G06T 3/4007 |
| 2026/0065056 | A1* | 3/2026 | Lefohn .................... G06N 3/08 |

OTHER PUBLICATIONS

Wronski, Bart. "Neural Material (de)Compression—Data-Driven Nonlinear Dimensionality Reduction." Bart Wronski, Jun. 8, 2021, bartwronski.com/2021/05/30/neural-material-decompression-data-driven-nonlinear-dimensionality-reduction/. (Year: 2021).*
Garigapati, Kaylan. "Things to Know." Kalyan Garigapati, 2020, kalyan0510.github.io/posts/pyramidcnncompression-post.html. (Year: 2020).*
Farhadzadeh, Farzad, et al. "Neural Graphics Texture Compression Supporting Random Access." European Conference on Computer Vision. Cham: Springer Nature Switzerland, 2024. (Year: 2024).*
Takikawa, Towaki, et al. "Variable bitrate neural fields." ACM SIGGRAPH 2022 Conference Proceedings. 2022. (Year: 2022).*
Vaidyanathan et al., U.S. Appl. No. 18/661,421, filed May 10, 2024.
Vaidyanathan et al., U.S. Appl. No. 18/661,448, filed May 10, 2024.
Wronski, B., "Dimensionality reduction for image and texture set compression," Blog, May 21, 2020, 31 pages, retrieved from https://bartwronski.com/2020/05/21/dimensionality-reduction-for-image-and-texture-set-compression/.
Wronski, B., "Neural material (de)compression—data-driven nonlinear dimensionality reduction," Blog, May 30, 2021, 16 pages, retrieved from https://bartwronski.com/2021/05/30/neural-material-decompression-data-driven-nonlinear-dimensionality-reduction/.
Alakuijala et al., "Guetzli: Perceptually Guided JPEG Encoder," Google Research Europe, Mar. 14, 2017, 13 pages, retrieved from https://arxiv.org/abs/1703.04421.
Alakuijala et al., "JPEG XL next-generation image compression architecture and coding tools," Applications of Digital Image Processing XLII, vol. 11137, Sep. 6, 2019, 13 pages, retrieved from https://doi.org/10.1117/12.2529237.
Andersson et al., "FLIP: A Difference Evaluator for Alternating Images," Proceedings of the ACM on Computer Graphics and Interactive Techniques, vol. 3, No. 2, Aug. 2020, 23 pages.
Arcila, T., "FidelityFX Super Resolution 2.0," Game Developers Conference, 2022, 3 pages, retrieved from https://bh.gdcvault.com/play/1027829/FidelityFX-Super-Resolution-2-0.
Balle et al., "End-to-end Optimized Image Compression," ICLR, 2017, pp. 1-27.
Balle et al., "Nonlinear Transform Coding," preprint accepted for IEEE Journal of Selected Topics in Signal Processing, 2020, pp. 1-17, retrieved from https://arxiv.org/abs/2007.03034.
Balle et al., "Variational Image Compression with a Scale Hyperprior," ICLR, 2018, pp. 1-47.
Blau et al., "The Perception-Distortion Tradeoff," IEEE Conference on Computer Vision and Pattern Recognition, 2018, pp. 6228-6237, retrieved from https://openaccess.thecvf.com/content_cvpr_2018/papers/Blau_The_Perception-Distortion_Tradeoff_CVPR_2018_paper.pdf.
Bross et al., "Overview of the Versatile Video Coding (VVC) Standard and Its Applications," IEEE Transactions on Circuits and Systems for Video Technology, vol. 31, No. 10, Oct. 2021, pp. 3736-3764.
Burley et al., "Physically Based Shading at Disney," ACM SIGGRAPH, 2012, 27 pages, retrieved from https://disneyanimation.com/publications/physically-based-shading-at-disney/.
Campbell et al., "Two Bit/Pixel Full Color Encoding," Computer Graphics (SIGGRAPH), 1986, pp. 215-223.
Chambon et al., "Passing Multi-Channel Material Textures to a 3-Channel Loss," ACM SIGGRAPH Talks, Aug. 2021, 2 pages.
Chen et al., "An Overview of Core Coding Tools in the AV1 Video Codec," IEEE Picture Coding Symposium (PCS), 2018, 6 pages, retrieved from https://www.researchgate.net/publication/327489524_An_Overview_of_Core_Coding_Tools_in_the_AV1_Video_Codec.
Cheng et al., "Learned Image Compression with Discretized Gaussian Mixture Likelihoods and Attention Modules," CVPR, 2020, pp. 7939-7948.
Courreges, A., "Graphics Studies Compilation," Blog, Dec. 29, 2020, 12 pages, retrieved from https://www.adriancourreges.com/blog/2020/12/29/graphics-studies-compilation/.
Fenny et al., "Texture Compression using Low-Frequency Signal Modulation," Graphics Hardware, 2003, 10 pages.
Hasselgren et al., "Neural Temporal Adaptive Sampling and Denoising," Computer Graphics Forum, Proceedings of Eurographics, 2020, 9 pages, retrieved from https://research.nvidia.com/publication/2020-05_neural-temporal-adaptive-sampling-and-denoising.
He et al., "Slang: language mechanisms for extensible real-time shading systems," ACM Transactions on Graphics, vol. 37, No. 4, Aug. 2018, pp. 1-13.
Hendrycks et al., "Gaussian Error Linear Units (GELUs)," arXiv, 2018, pp. 1-9, retrieved from https://arxiv.org/pdf/1606.08415v3.
Hofmann et al., "Interactive Path Tracing and Reconstruction of Sparse Volumes," Proceedings of the ACM on Computer Graphics and Interactive Techniques, vol. 4, No. 1, May 2021, pp. 1-19.
Hornik, K., "Multilayer Deedforward Networks are Universal Approximators," Neural Networks, vol. 02, pp. 359-366, 1989.
Howard et al., "Searching for MobileNetV3," ICCV, 2019, pp. 1314-1324, retrieved from https://openaccess.thecvf.com/content_ICCV_2019/papers/Howard_Searching_for_MobileNetV3_ICCV_2019_paper.pdf.
Geldreich et al., "basis_universal, Basis Universal Supercompressed GPU Texture Codec," GutHub, 2023, 13 pages, retrieved from https://github.com/BinomialLLC/basis_universal.
Barczak et al., "InteIR Arc Graphics Developer Guide for Real-Time Ray Tracing in Games," Intel Developer Guide, 2023, 29 pages.
Jacob et al., "Quantization and Training of Neural Networks for Efficient Integer-Arithmetic-Only Inference," CVPR, 2018, pp. 2704-2713, retrieved from https://openaccess.thecvf.com/content_cvpr_2018/papers/Jacob_Quantization_and_Training_CVPR_2018_paper.pdf.
Kawiak et al., "Intel Xe Super Sampling (XeSS)—an AI-based Upscaling for Real-Time Rendering," Powerpoint Presentation at Game Developers Conference, Mar. 24, 2022, 27 pages.
Kingma et al., "Adam: A Method for Stochastic Optimization," ICLR, 2015, pp. 1-9.
Knittel et al., "Hardware for Superior Texture Performance" Eurographics, EGGH/SIGGRAPH, 1995, 8 pages.
Kuznetsov et al., "NeuMIP: Multi-Resolution Neural Materials," ACM Transactions on Graphics, vol. 40, No. 4, Aug. 2021, 13 pages.
Ledig et al., "Photo-Realistic Single Image Super-Resolution Using a Generative Adversarial Network," CVPR, 2017, pp. 4681-4690, retrieved from https://openaccess.thecvf.com/content_cvpr_2017/papers/Ledig_Photo-Realistic_Single_Image_CVPR_2017_paper.pdf.
Liu et al., "Non-local Attention Optimized Deep Image Compression," arXiv, 2019, pp. 1-10, retrieved from https://arxiv.org/pdf/1904.09757.
Lombardi et al., "Neural Volumes: Learning Dynamic Renderable Volumes from Images," ACM Transactions on Graphics, vol. 38, No. 4, Jul. 2019, 14 pages.
Loshchilov et al., "SGDR: Stochastic Gradient Descent with Warm Restarts," ICLR, 2017, pp. 1-16.

(56) References Cited

OTHER PUBLICATIONS

Mentzer et al., "High-Fidelity Generative Image Compression," 34th Conference on Neural Information Processing Systems (NeurIPS), 2020, pp. 1-12.
White et al., "Texture Block Compression in Direct3D 11," Microsoft Learn, Aug. 19, 2020, 5 pages, retrieved from https://learn.microsoft.com/en-us/windows/win32/direct3d11/texture-block-compression-in-direct3d-11.
Mildenhall et al., "NeRF: Representing Scenes as Neural Radiance Fields for View Synthesis," Communications of the ACM, vol. 65, No. 1, Jan. 2022, pp. 99-106.
Muller et al., "Instant Neural Graphics Primitives with a Multiresolution Hash Encoding," ACM Transactions on Graphics, vol. 41, No. 4, Jul. 2022, pp. 1-15.
Muller et al., "Real-time Neural Radiance Caching for Path Tracing," ACM Transactions on Graphics, vol. 40, No. 1, Aug. 2021, pp. 1-16.
Munkberg et al., "High Dynamic Range Texture Compression for Graphics Hardware," ACM Transactions on Graphics, 2006, 9 pages, retrieved from https://fileadmin.cs.lth.se/graphics/research/papers/hdrtexture2006/hdr_tc.pdf.
Narkowicz, K., "ACES Filmic Tone Mapping Curve," WordPress, Blog, Jan. 6, 2016, 8 pages, retrieved from https://knarkowicz.wordpress.com/2016/01/06/aces-filmic-tone-mapping-curve/.
Neubelt et al., "Crafting a Next-Gen Material Pipeline for The Order: 1886," SIGGRAPH 2013 Course: Physically Based Shading in Theory and Practice, 2013, 29 pages, retrieved from https://blog.selfshadow.com/publications/s2013-shading-course/.
NVIDIA, "NVVM IR Specification," NVIDIA Corp., 2024, 61 pages, retrieved from https://docs.nvidia.com/cuda/nvvm-ir-spec/index.html.
NVIDIA, "CUDA C++ Programming Guide," NVIDIA Corp., 2024, 613 pages, retrieved from https://docs.nvidia.com/cuda/cuda-c-programming-guide/.
Rusch et al., "Improve Shader Performance and In-Game Frame Rates with Shader Execution Reordering," NVIDIA Developer Technical Blog, Oct. 12, 2022, 7 pages, retrieved from https://developer.nvidia.com/blog/improve-shader-performance-and-in-game-frame-rates-with-shader-execution-reordering/.
Nystad et al., "Adaptive Scalable Texture Compression," High Performance Graphics, 2012, pp. 105-114.
Ouyang et al., "ReSTIR GI: Path Resampling for Real-Time Path Tracing," High-Performance Graphics, vol. 40, No. 8, 2021, 13 pages.
Park et al., "DeepSDF: Learning Continuous Signed Distance Functions for Shape Representation," CVPR, 2019, pp. 165-174.
Paszke et al., "PyTorch: An Imperative Style, High-Performance Deep Learning Library," 33rd Conference on Neural Information Processing Systems (NeurIPS), 2019, pp. 1-12.
Perkins et al., Virtual Production in Action: A Creative Implementation of Expanded Cinematography and NarrativesACM SIGGRAPH Posters, Article 21, 2022, 2 pages, retrieved from https://history.siggraph.org/learning/virtual-production-in-action-a-creative-implementation-of-expanded-cinematography-and-narratives-by-perkins-and-echeverry/.
Pranckevicius, A., "Texture Compression in 2020," Blog, Dec. 8, 2020, 16 pages, retrieved from https://aras-p.info/blog/2020/12/08/Texture-Compression-in-2020/.
Rippel et al., "Real-Time Adaptive Image Compression," Proceedings of the 34th International Conference on Machine Learning, PMLR, 2017, 9 pages, retrieved from https://proceedings.mlr.press/v70/rippel17a.html.
Roimela et al., "Efficient High Dynamic Range Texture Compression," ACM Transactions on Graphics , vol. 25, Jul. 2006, pp. 8 pages, retrieved from https://www.researchgate.net/publication/220183464_High_dynamic_range_texture_compression.
Skodras et al., "The JPEG 2000 Still Image Compression Standard," IEEE Signal Processing Magazine, Sep. 2001, pp. 36-58.
Strom et al., "iPACKMAN: High-Quality, Low-Complexity Texture Compression for Mobile Phones," Graphics Hardware, 2005, 9 pages.
Strom et al., "ETC2: Texture Compression using Invalid Combinations," Graphics Hardware, 2007, 7 pages.
Takikawa et al., "Variable Bitrate Neural Fields," SIGGRAPH '22 Conference Proceedings, Aug. 7-11, 2022, pp. 1-10.
Tancik et al., "Fourier Features Let Networks Learn High Frequency Functions in Low Dimensional Domains," 34th Conference on Neural Information Processing Systems (NeurIPS), 2020, pp. 1-11.
Tartarchuk et al., "Advances in Real-Time Rendering in Games: Part I," Siggraph, 2022, 9 pages, retrieved from https://advances.realtimerendering.com/s2022/index.html.
Tartarchuk et al., "Advances in Real-Time Rendering in Games: Part I," SIGGRAPH, 2021, 16 pages, retrieved from https://advances.realtimerendering.com/s2021/.
Tewari et al., "Advances in Neural Rendering," Eurographics, 2022, 33 pages, retrieved from https://arxiv.org/pdf/2111.05849.
Theis et al., "Lossy Image Compression with Compressive Autoencoders," ICLR, 2017, pp. 1-19.
Thies et al., "Deferred Neural Rendering: Image Synthesis using Neural Textures," SIGGRAPH, 2019, 12 pages, retrieved from https://arxiv.org/abs/1904.12356.
Thomas et al., "Temporally Stable Real-Time Joint Neural Denoising and Supersampling," Proceedings of the ACM on Computer Graphics and Interactive Techniques, vol. 5, Jul. 2022, pp. 1-22.
Trowbridge et al., "Average Irregularity Representation of a Rough Surface for Ray Reflection," Journal of the Optical Society of America, vol. 65, No. 5, May 1975, pp. 531-536.
Ulyanov et al., "Deep Image Prior," IEEE Conference on Computer Vision and Pattern Recognition, 2018, pp. 9446-9454.
Van Den Oord et al., "Neural Discrete Representation Learning," 31st Conference on Neural Information Processing Systems (NIPS), 2017, pp. 1-10.
Vaswani et al., "Attention Is All You Need," 31st Conference on Neural Information Processing Systems (NIPS), 2017, pp. 1-11.
Wallace, G., "The JPEG Still Picture Compression Standard," Communications of the ACM, vol. 34, No. 4, Apr. 1991, pp. 31-44.
Wang et al., "Image Quality Assessment: From Error Visibility to Structural Similarity,". IEEE Transactions on Image Processing, vol. 13, No. 4, Apr. 2004, pp. 1-14.
Wikipedia, "S3 Texture Compression," Wikipedia, 2024, 6 pages, retrieved from https://en.wikipedia.org/wiki/S3_Texture_Compression.
Wolfe et al., "Spatiotemporal Blue Noise Masks," Eurographics Symposium on Rendering, 2022, 10 pages.
Yan et al., "Demystifying Tensor Cores to Optimize Half-Precision Matrix Multiply," IEEE International Parallel and Distributed Processing Symposium, 2020, 10 pages, retrieved from https://www.semanticscholar.org/paper/Demystifying-Tensor-Cores-to-Optimize-Matrix-Yan-Wang/ed32fef79581afa6c33a3afe34c2ee723156a055.
Yang et al., "A Survey of Temporal Antialiasing Techniques," Eurographics, vol. 39, No. 2, 2020, 15 pages.
Zhang et al., "The Unreasonable Effectiveness of Deep Features as a Perceptual Metric," CVPR, 2018, pp. 586-595, retrieved from https://openaccess.thecvf.com/content_cvpr_2018/papers/Zhang_The_Unreasonable_Effectiveness_CVPR_2018_paper.pdf.
Zontak et al., "Internal Statistics of a Single Natural Image," CVPR, 2011, pp. 977-984, retrieved from https://www.wisdom.weizmann.ac.il/~vision/SingleImageStatistics/Zontak_Irani_CVPR2011.pdf.
Delp et al., "Image Compression Using Block Truncation Coding," IEEE Transactions on Communications, Oct. 1979, pp. 1335-1342.
Restriction Requirement from U.S. Appl. No. 18/661,421, dated Mar. 18, 2026.
Non-Final Office Action from U.S. Appl. No. 18/661,448, dated Apr. 22, 2026.
Non-Final Office Action from U.S. Appl. No. 18/661,421, dated Jun. 12, 2026.

* cited by examiner

500

COMPRESSION OF TEXTURE SETS USING A NON-LINEAR FUNCTION AND QUANTIZATION

CLAIM OF PRIORITY

This application claims the benefit of U.S. Provisional Application No. 63/441,720 titled "RANDOM-ACCESS NEURAL COMPRESSION OF MATERIAL TEXTURES," filed Jan. 27, 2023, the entire contents of which is incorporated herein by reference.

TECHNICAL FIELD

The present disclosure relates to texture compression for computer graphics.

BACKGROUND

In computer graphics, texture refers to a type of surface, including the material characteristics, that can be applied to an object in an image. A texture may be defined using numerous parameters, such as color(s), roughness, glossiness, etc. In some implementations, a texture may be represented as an image that can be placed on a three-dimensional (3D) model of an object to give surface details to the 3D object. Textures can accordingly be used to provide photorealism in computer graphics, but they also have certain storage, bandwidth, and memory demands. Thus, limited disk storage, download bandwidth, and memory size constraints must be addressed to continuously improve photorealism in computer graphics via more detailed and available textures.

As a solution to reduce these resource demands, textures can be compressed (i.e. reduced in size using some preconfigured compression algorithm) prior to storage and/or network transmission. However, current texture compression methods are lacking. For example, traditional block-based texture compression methods, which rely on fixed sized blocks, are designed only for moderate compression rates. Block-based compression methods are also limited in the number of material properties that can be compressed together per texture, and as a result require multiple textures to cover all the desired material properties.

Neural image compression, which has been introduced more recently for compressing textures, incorporates non-linear transformations in the form of neural networks to aid compression and decompression. Neural image compression methods require large-scale image data sets and expensive training. They are also not suitable for real-time rendering because of their lack of random access and their inability to compress non-color material properties and a high decompression cost.

There is thus a need for addressing these issues and/or other issues associated with the prior art. For example, there is a need to compress a texture set using a non-linear function and quantization. There is also a need to compress one or more textures with an arbitrary number of channels and/or an arbitrary ordering of channels using a non-linear function.

SUMMARY

A method, computer readable medium, and system are disclosed to provide compression of a texture set using a non-linear function. A plurality of textures in a set of textures are compressed together, using a non-linear function and quantization. A result of the compression is output.

Additionally, a method, computer readable medium, and system are disclosed to provide compression of one or more textures using a non-linear function. One or more textures having an arbitrary number of channels and/or an arbitrary ordering of channels are compressed, using a non-linear function. A result of the compression is output.

Further, in an embodiment, a method, computer readable medium, and system are disclosed to use quantization during compression of a texture set. A defined number of quantization levels is determined. A scalar or vector quantization of a compressed representation of a plurality of textures in a set of textures is then learned, based on the defined number of quantization levels, where the compressed representation is a pyramid of a plurality of feature levels, wherein each feature level of the plurality of feature levels includes a plurality of grids.

DETAILED DESCRIPTION

Figure 1A:
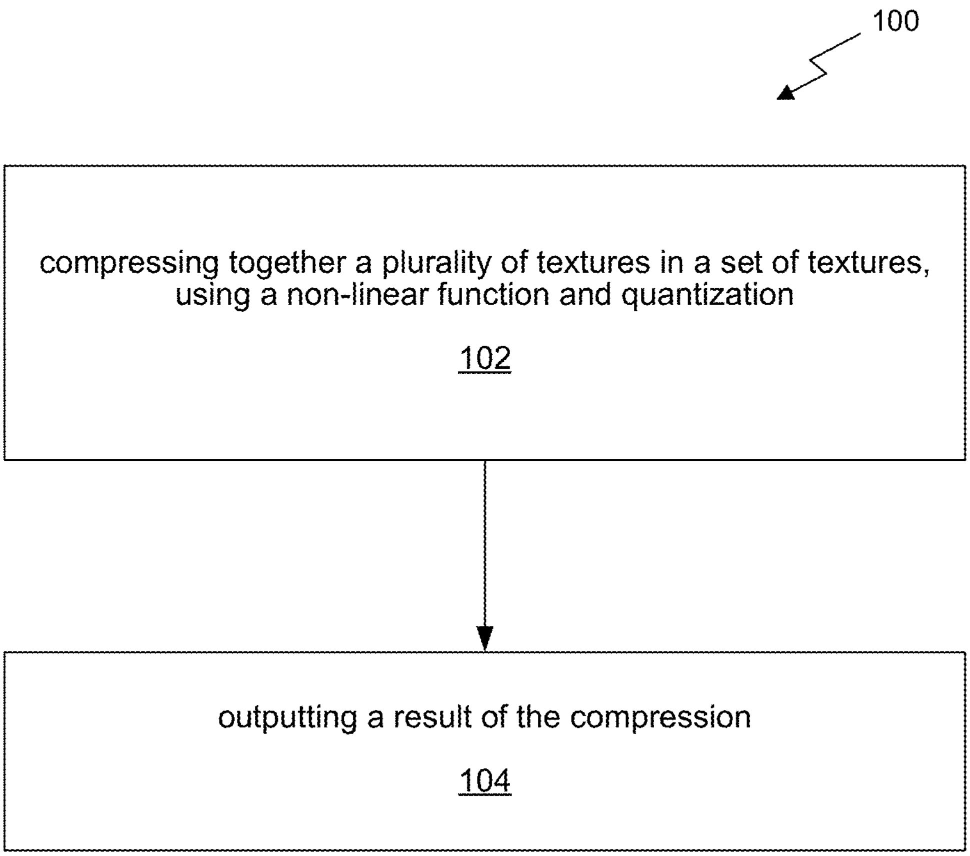
FIG. 1A illustrates a flowchart of a method for compression of a texture set using a non-linear function and quantization, in accordance with an embodiment.

FIG. 1A illustrates a flowchart of a method 100 for compression of a texture set using a non-linear function and quantization, in accordance with an embodiment. The method 100 may be performed by a device, which may be comprised of a processing unit, a program, custom circuitry, or a combination thereof, in an embodiment. In another embodiment, a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100.

In operation 102, a plurality of textures in a set of textures are compressed together, using a non-linear function. With respect to the present description, a texture refers to a data representation of at least one property of an object surface. The data representation may be in two-dimensions (2D), three-dimensions (3D) [e.g. 2D with also a time dimension, or volumetric], four-dimensions (4D) [e.g. volumetric with also a time dimension), or in other embodiments even a greater number of dimensions. The property(ies) may be of a physical material (e.g. metal, wood, ceramic, glass, etc.), in an embodiment. In various examples, each property may indicate ambient occlusion, roughness, metalness, diffuse color, normals maps, height maps, glossiness, other Bidirectional Reflectance Distribution Function (BRDF) information, subsurface scattering properties, anisotropy, transmittance, etc. Of course, it should be noted that the method 100 may involve any arbitrary material properties represented by a texture.

In an embodiment, the texture may be represented as an image. The texture can be applied to a surface of an object (e.g. in an image) to give surface details to the object. The object may be a 2D object or a 3D object.

As mentioned, in the present embodiment a plurality of textures in a set of textures are compressed together. In an embodiment, the set of textures (or "texture set") may represent a (particular) material. For example, each texture in the texture set may represent a different property of the material. In an embodiment, the textures in the texture set may be layered or otherwise combined to represent a specific material, such that when applied to an object the surface of the object appears to be of the material.

In an embodiment, at least one texture in the texture set may include a plurality of channels. In this embodiment, each channel of the texture may store data for a different property of the object surface. Thus, as noted above, each texture may store one or more properties of the object surface. Of course, in other embodiments, at least one texture in the texture set may include a single channel.

The textures in the texture set may be compressed together in any manner that uses a non-linear function and quantization. In the context of the present description, the non-linear function refers to a function that uses non-linear transformations to compress the textures in the texture set together. In an embodiment, the non-linear function is a neural network, which uses for example non-linear transformations in one or more of its layers. Quantization refers to reducing a bit count. The quantization may be scalar or vector quantization.

In an embodiment, compressing together the plurality of textures in the texture set may include exploiting correlations (e.g. redundancies) across the plurality of textures in the texture set. In an embodiment, compressing together the plurality of textures in the texture set may include exploiting correlations across a plurality of channels of the plurality of textures in the texture set. In embodiments, the non-linear function may exploit correlations spatially across each texture in the set of textures and/or may exploit correlations across mip levels. A mip level refers to a version (level) of a texture with a specific resolution, where multiple mip levels for a texture may be progressively smaller with lower resolution versions of that same texture. In the present embodiment, the correlations across mip levels may refer to those correlations across mip levels of a same texture. In general, exploiting correlations refers to at least partially reducing the correlated (e.g. redundant) data during compression.

In operation 104, a result of the compression is output. In an embodiment, the result of the compression may be a compressed representation of the set of textures in the texture set, or in other words a compressed representation of the texture set. Thus, the result of the compression may be smaller in size (memory-wise) than the original texture set.

In an embodiment, the compressed representation may be a pyramid of a plurality of feature levels, where each feature level of the plurality of feature levels includes a plurality of grids, which may be in 2D, 3D, etc. corresponding to the dimensions of the original textures. In an embodiment, the grids may store data that can be used during texture decompression to unpack at least a portion of an image or texture. In an embodiment, each feature level of the plurality of feature levels may include exactly two grids, for example with a first one of two grids being at a higher resolution than a second one of the two grids.

In another embodiment, a resolution of the grids may be reduced across the plurality of feature levels, from a top feature level of the pyramid to a bottom feature level of the pyramid. In another embodiment, a resolution of the grids may be less than a resolution of the plurality of textures in the texture set prior to compression. In an embodiment, cells of the plurality of grids may store feature vectors of quantized latent values. In an embodiment, each feature level of the plurality of feature levels may represent a plurality of mip levels.

In an embodiment, the non-linear function may be a decoder that utilizes a multi-layer perceptron (MLP). In an embodiment, the compressed representation may be learned together with weights of the MLP. In an embodiment, the compressed representation may be optimized through quantization-aware training and backpropagation through the decoder.

With respect to the present method 100, the non-linear function may learn a compressed representation of the set of textures individually. Accordingly, the method 100 may be repeated for different texture sets (e.g. representing different materials). In this way, the compressed representation of each of those different texture sets may be individually (i.e. separately) learned using the non-linear function.

As mentioned, the result of the compression of the texture set is output. In an embodiment, the result may be output to storage. The storage may be memory local to the device that performed the compression of the texture set of memory remote from the device that performed the compression of the texture set. In an embodiment, the result may be output to a remote computing device (e.g. over a network) for use in rendering an image. For example, the remote computing device may be configured to decompress at least a portion of the compressed texture set to access at least a portion of the textures in the texture set, and further to apply the decompressed portion of textures to an object in an image when rendering the image. Of course, in another embodiment the device that performed the compression may access the compressed texture set from local or remote storage to likewise decompress and use the same to render an image.

The texture compression method 100 disclosed herein may enable real-time decompression, as described in more detail below, and may support modern computer graphics applications, such as games and architectural visualization, by providing more accurate detail and complexity for texture data.

Figure 1B:
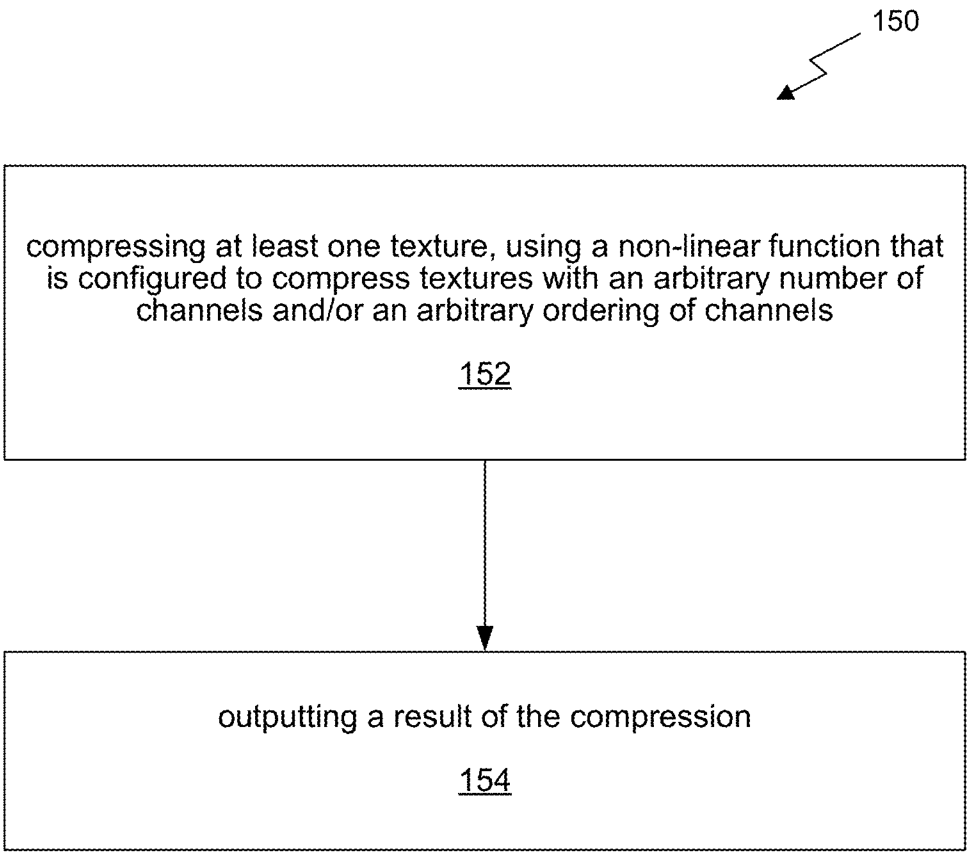
FIG. 1B illustrates a flowchart of a method for compression of one or more textures using a non-linear function, in accordance with an embodiment.

FIG. 1B illustrates a flowchart of a method 150 for compression of one or more textures using a non-linear function, in accordance with an embodiment. The method 150 may be performed by a device, which may be comprised of a processing unit, a program, custom circuitry, or a combination thereof, in an embodiment. In another embodiment, a system comprised of a non-transitory memory storage comprising instructions, and one or more processors in communication with the memory, may execute the instructions to perform the method 150. In another embodiment, a non-transitory computer-readable media may store computer instructions which when executed by one or more processors of a device cause the device to perform the method 150.

As the present method 150 references texture compression by a non-linear function, it should be noted that at least some of the definitions and descriptions given above with reference to FIG. 1A may equally apply to the present description of FIG. 1B.

In operation 152, at least one texture is compressed, using a non-linear function that is configured to compress textures with an arbitrary number of channels and/or an arbitrary ordering of channels. In an embodiment, the non-linear function may be used to compress a single texture. In another embodiment, the non-linear function may be used to compress together a plurality of textures included in a set of textures.

In an embodiment, the non-linear function may be configured to compress textures with the arbitrary number of channels. In other words, the non-linear function may compress any input texture or input texture set regardless of the number of channels included in the texture. Thus, the non-linear function may be not limited to processing input textures with a specific channel count.

In another embodiment, the non-linear function may be configured to compress textures with the arbitrary number of channels. In other words, the non-linear function may compress any input texture or input texture set regardless of the ordering of channels included in the texture. Thus, the non-linear function may be not limited to processing input textures with a specific channel order.

In operation 152, a result of the compression is output. This may be performed as described above in operation 150 of FIG. 1A.

Further embodiments will now be provided in the description of the subsequent figures. It should be noted that the embodiments disclosed herein with reference to the method 100 of FIG. 1A and/or the method 150 of FIG. 1B may apply to and/or be used in combination with any of the embodiments of the remaining figures below.

Figure 2:
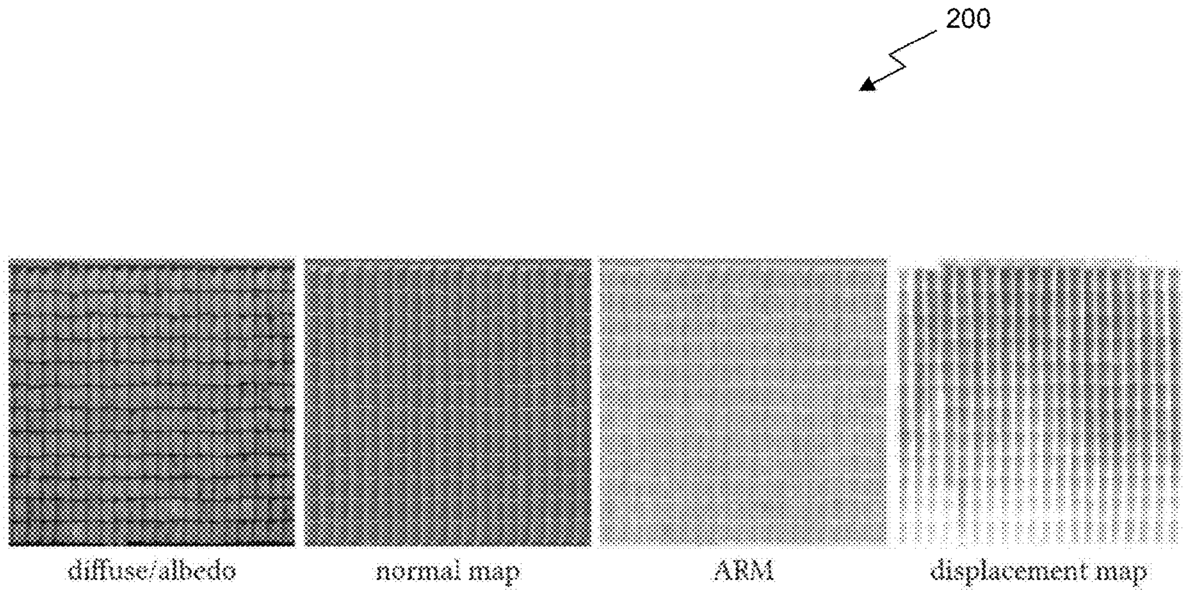
FIG. 2 illustrates an exemplary texture set, in accordance with an embodiment.

FIG. 2 illustrates an exemplary texture set 200, in accordance with an embodiment. It should be noted that the texture set 200 shown and described is set forth for illustrative purposes only. The present disclosure is applicable to texture sets have any combination and number of different textures (e.g. representing different materials).

In the example shown, the texture set includes four different textures, consisting of a diffuse map, a normal map, an ARM (ambient occlusion, roughness, metalness) texture, and a displacement map. The texture set represents a ceramic roof material. The method 100 of FIG. 1 described above may process the exemplary texture set shown to compress the four different textures together.

Figure 3:
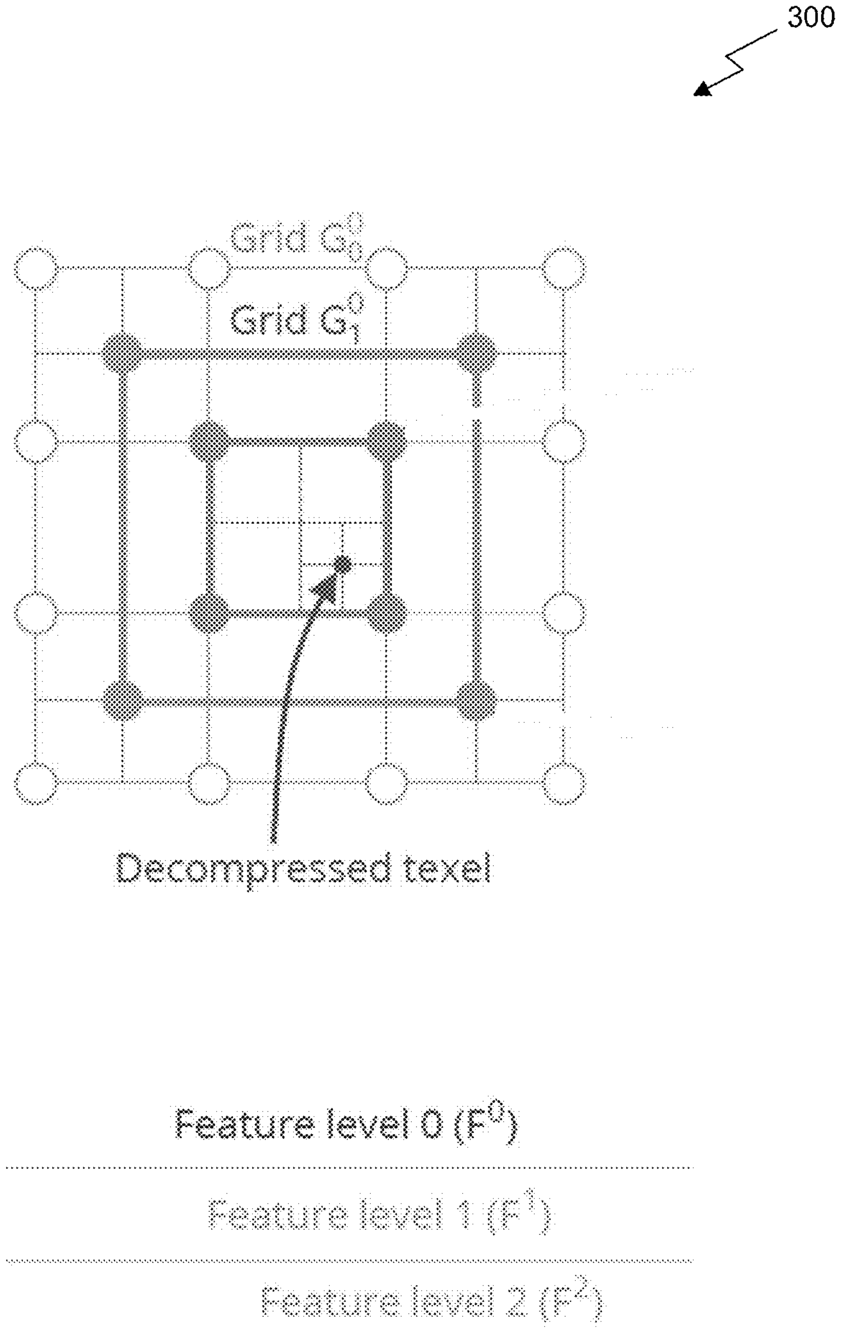
FIG. 3 illustrates an exemplary compressed representation of a texture set as a pyramid of a plurality of feature levels, in accordance with an embodiment.

FIG. 3 illustrates an exemplary compressed representation 300 of a texture set as a pyramid of a plurality of feature levels, in accordance with an embodiment. The compressed representation 300 shown is one embodiment of the result of the texture compression method 100 of FIG. 1 when applied to a texture set. It should be noted that a similar compressed representation 300 may result from the compression method 150 of FIG. 1B when applied to a single texture. Furthermore, the compressed representation 300 as shown and described correlates with 2D textures, but it should be noted that the concepts described may be extended to textures with greater dimensions.

As mentioned, the compressed representation 300 is a pyramid of multiple feature levels $F_j$, with each level, j, comprising a pair of 2D grids, $$G_0^j \text{ and } G_1^j.$$

The grids' cells store feature vectors of quantized latent values, which are utilized to predict multiple mip levels of the original texture set. This sharing of features across two or more mip levels lowers the storage cost of a traditional mipmap chain. Furthermore, within a feature level, grid $G_0$ is at a higher resolution, which helps preserve high-frequency details, while $G_1$ is at a lower resolution, improving the reconstruction of low-frequency content, such as color and smooth gradients.

Table 1 illustrates the exemplary feature levels and grid resolutions for a 1024×1024 texture set. The resolution of the grids is significantly lower than the texture resolution, resulting in a highly compressed representation of the entire mip chain. Typically, a feature level represents two mip levels, with some exceptions; the first feature level must represent all higher resolution mips (levels 0 to 3), and the last feature level represents the bottom three mip levels, as it cannot be further downsampled.

TABLE 1

| Feature level $F^j$ | Gj0 grid resolution | Gj1 grid resolution | Predicted mip levels |
|---|---|---|---|
| 0 | 256 × 256 | 128 × 128 | 0, 1, 2, 3 |
| 1 | 64 × 64 | 32 × 32 | 4, 5 |
| 2 | 16 × 16 | 8 × 8 | 6, 7 |
| 3 | 4 × 4 | 2 × 2 | 8, 9, 10 |

In an embodiment, the 2D grids may store data that can be used during texture decompression to unpack at least a portion of an image or texture. In an embodiment, each feature level of the plurality of feature levels may include exactly two 2D grids, for example with a first one of two 2D grids being at a higher resolution than a second one of the two 2D grids. In another embodiment, a resolution of the 2D grids may be reduced across the plurality of feature levels, from a top feature level of the pyramid to a bottom feature level of the pyramid. In another embodiment, a resolution of the 2D grids may be less than a resolution of the plurality of textures in the texture set prior to compression.

Figure 4:
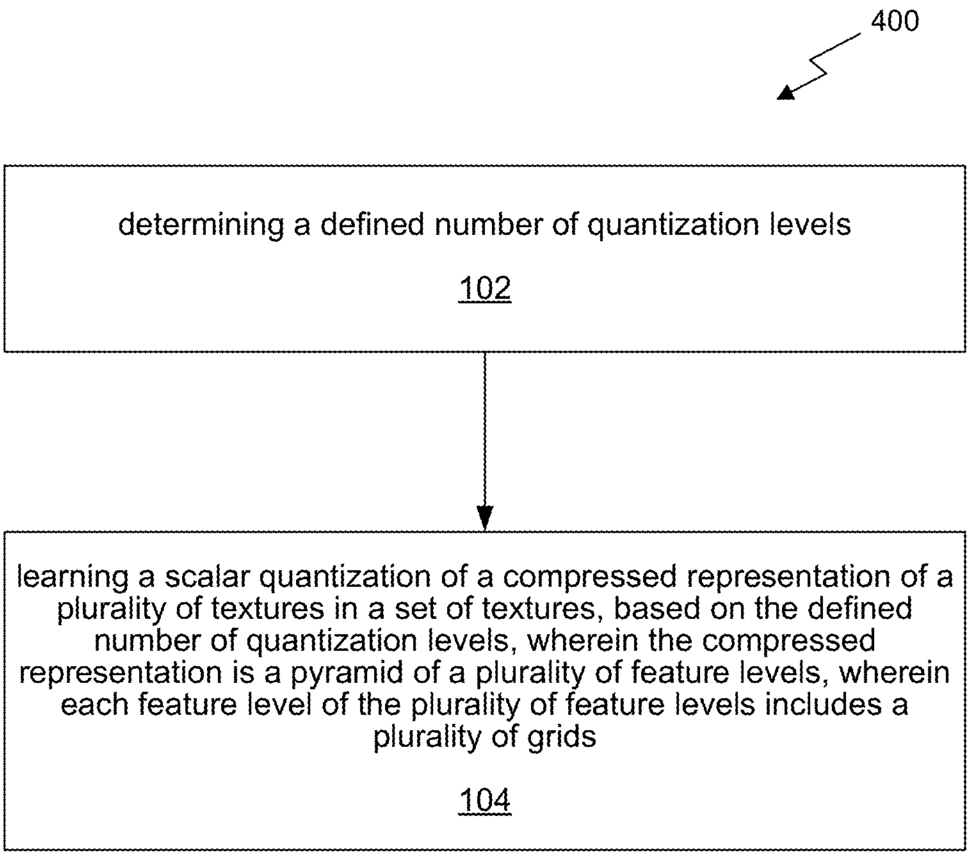
FIG. 4 illustrates a flowchart of a method for learning a scalar or vector quantization of the compressed representation of the texture set shown in FIG. 3, in accordance with an embodiment.

FIG. 4 illustrates a flowchart of a method 400 for learning a scalar or vector quantization of the compressed representation of the texture set shown in FIG. 3, in accordance with an embodiment. The method 400 may be used in combination with the embodiments of the Figures described above. Thus, any reference below to a texture set may likewise apply to compression methods for single (individual) textures.

As mentioned with respect to FIG. 3, the compressed representation is a pyramid of a plurality of feature levels, where each feature level of the plurality of feature levels includes a plurality of grids. The grids' cells store feature vectors of quantized latent values. Specifically, the compressed representation is directly optimized through quantization-aware training.

In operation 402, a defined number of quantization levels is determined. In an embodiment, the number of quantization levels may be limited to a defined quantization range. For example, the number of quantization levels may be limited by clamping features to a defined quantization range during training. In operation 404, a scalar or vector quantization of the compressed representation of the plurality of textures in the set of textures is learned, based on the defined number of quantization levels.

Details

In an embodiment, use of entropy coding is avoided in order to enable random access, and instead a fixed quantization rate is enforced for all latent values in a feature grid and only optimization for image distortion is performed. Quantization errors are simulated by adding uniform noise in the range $$\left(-\frac{Q_k}{2}, \frac{Q_k}{2}\right)$$

to the features, where $Q_k$ is the range of a quantization bin on grid k. To limit the number of quantization levels, features are clamped to the quantization range after they are updated in the backward pass. This ensures that both gradient computations and feature updates are, with reference to values, strictly within the quantization range.

For each feature grid $$G_k^j,$$

an asymmetric quantization range of $$\left[-\frac{N_k - 1}{2}Q_k, \frac{N_k}{2}Q_k\right]$$

is used, where $N_k=2^{B_k}$ is the desired number of quantization levels. This quantizes a zero value with no error by aligning it with the center of a quantization bin. In turn, this produces better results especially when quantizing to four levels or less. $Q_k$ is set to $$\frac{1}{N_k}$$

and therefore $N_k$ is the only value provided during training. Toward the end of the training process, noise is no longer added to simulate quantization and the feature values are explicitly quantized. The feature values are frozen for the rest of the training. Then, the network weights are continued to be optimized over additional (e.g. 5%) more steps, adapting them to the discrete-valued grids.

Figure 5:
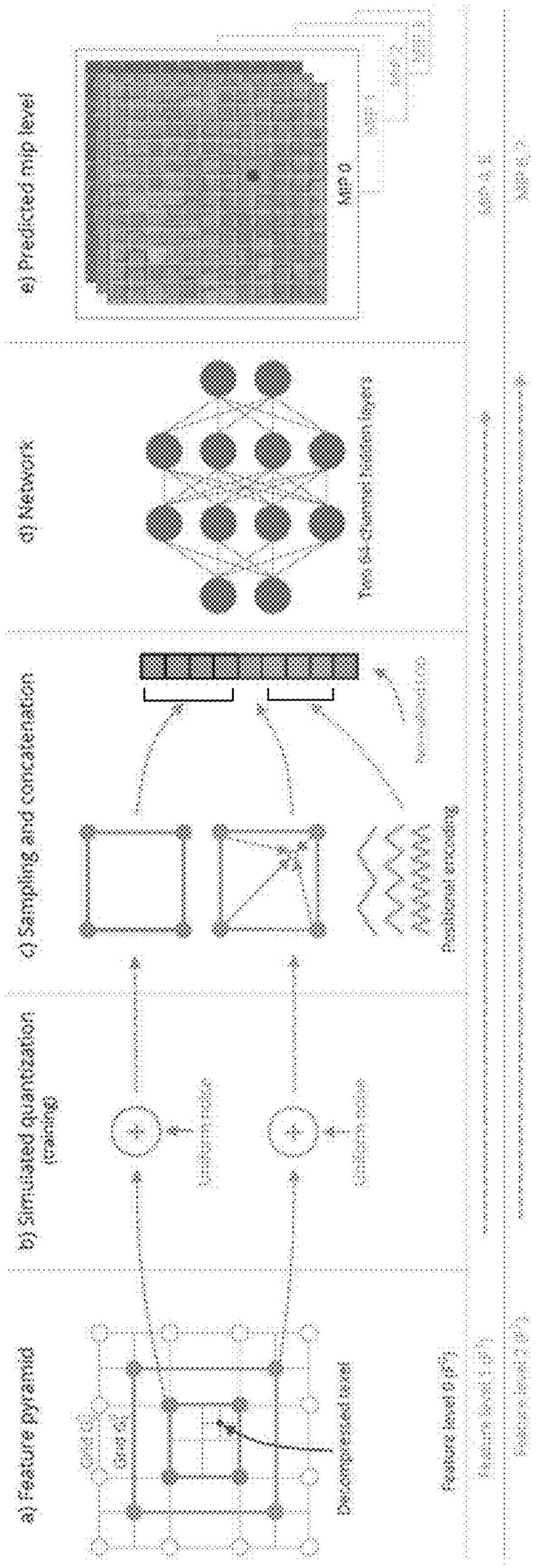
FIG. 5 illustrates a pictorial representation of the training and inferencing steps associated with the compressed representation of the texture set shown in FIG. 3, in accordance with various embodiments.

FIG. 5 illustrates a pictorial representation of the training and inferencing steps 500 associated with the compressed representation of the texture set shown in FIG. 3, in accordance with various embodiments.

In the present embodiment, the texture set is represented as a tensor with dimensions w×h×c and the model compresses the tensor without making any assumptions about the channel count or the specific semantics of each channel. For example, the normals or diffuse albedo could be mapped to any channels without affecting compression. This is possible because the compressed representation is learned for each material individually, effectively specializing it for its unique semantics. The only assumption made is that each texture in a texture set has the same width and height. Some materials can have BRDF properties not present in other ones, for instance, subsurface scattering color or thickness.

FIG. 5 illustrates the decoding process, progressing from a compressed representation, on the left, to a decompressed texel, on the right. As described in FIG. 3, the compressed representation is a pyramid of quantized features levels, which are typically at a lower resolution compared to the reference texture. To achieve decompression of a single texel, feature vectors are sampled from a feature level and subsequently decoded to generate all channels within the texture set. To facilitate greater feature decorrelation, the decoder is modeled as a non-linear transform, utilizing a MLP as a universal approximator. This MLP is shared across all the mip levels, which enables joint learning of the compressed representation and the MLP's weights, using an autodecoder framework.

Specifically, the compressed representation (FIG. 3) is directly optimized through quantization-aware training (FIG. 4) and backpropagation through the decoder, as opposed to using an encoder. In part a) which illustrates the compressed representation, the solid circles represent the grid cells accessed for a target texel. Part b) shows that during training quantization is simulated through the addition of noise and clipping.

Sampling and Concatenation

Part c) illustrates that during inference and training, the four neighboring feature vectors (solid circles) are sampled from the grid $G_0$ and further features are bilinearly interpolated from $G_1$ (hollow circle) and then concatenated with local positional encoding and a normalized level-of-detail (LOD) value for the target mip level.

More specifically, the first stage of decompression samples the grids of a feature level and prepares the input to the MLP, as shown in part c). In this stage, a feature level is selected based on the desired level of detail (LOD) (e.g. see Table 1 above), and then resample both the grids in the feature level are resampled to the target resolution.

Generally, grids are resampled by interpolating the features at the target texel location, where a positional encoding scheme aids in interpolation and preserves high-frequency details. More specifically, features may be upsampled or downsampled depending on the feature level and the target LOD. However, upsampling the first feature level $F^0$ alone presents the main challenge for reconstruction quality, as it is typically at a much lower resolution than the input texture. To a large extent, the lower resolution of the grids is relied on for compression.

To achieve real-time decompression performance, complexity is balanced against reconstruction quality by using two different approaches for resampling the grids. A learned interpolation approach is used for the higher resolution grid $G_0$ and bilinear interpolation is used for the lower resolution grid $G_1$. In the case of learned interpolation, four neighboring feature vectors are concatenated and phase information from the positional encoding (described below) is relied on to reconstruct high-frequency details. Concatenation, as opposed to summation of weighted features, allows the following MLP layers to combine features differently depending on the texel location. However, the learned interpolation also increases the cost of the input layer of the network. The bilinear interpolation of the low resolution grid was chosen to limit this. The smooth output of bilinear interpolation can compliment learned interpolation well by suppressing banding artifacts resulting from heavily quantized features.

To improve the fidelity of high-frequency details, the decoder is conditioned on positional encoding. Instead of passing the input coordinates p directly to the MLP, this method encodes it as a vector of $\sin(2^h\pi p)$ and $\cos(2^h\pi p)$ terms, where h represents an octave. This can overcome the low-frequency bias of MLPs. A more computationally efficient variant of the encoding is used, which is based on triangular waves, and even still no quality loss is observed.

Figure 6:
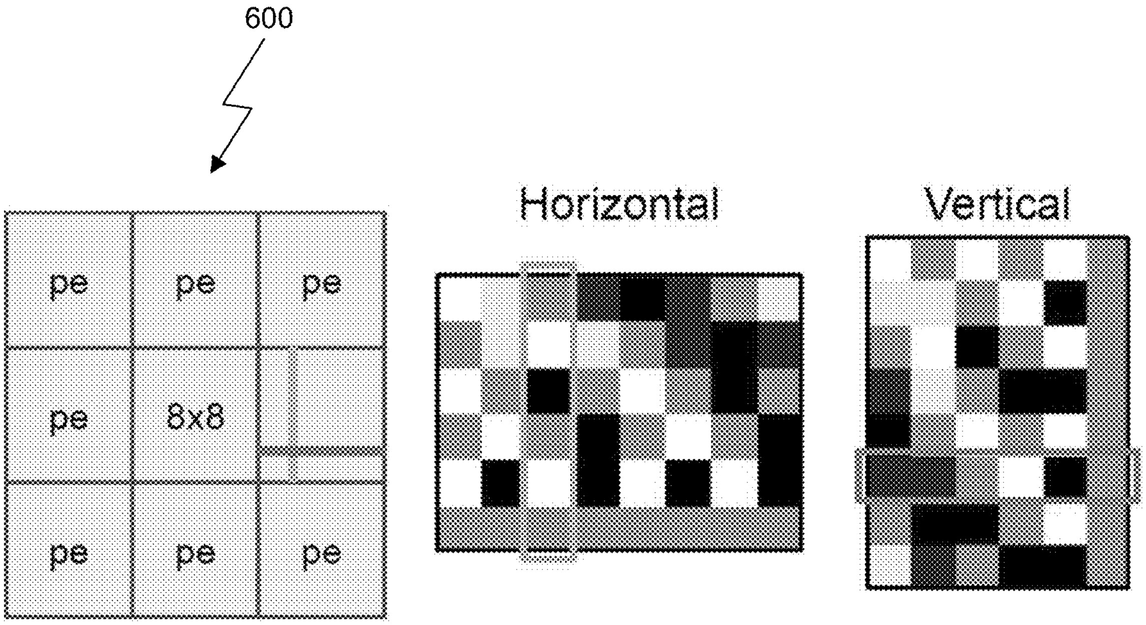
FIG. 6 illustrates a tiled positional encoding used during decompression of a compressed texture set, in accordance with an embodiment.

It should be noted that in an embodiment the architecture is not fully coordinate-based since features stored in low-resolution grids are used. Therefore, any low-frequency information can be directly represented by the features, and positional encoding is only needed to represent frequencies higher than the Nyquist limit of the grids. In one exemplary embodiment, the number of octaves for the encoding is $\log_2 8$, as 8 is the maximum upsampling factor encountered, i.e., when upsampling grid $G_1$ to a target LOD of 0. Consequently, the encoding is a tiled pattern that repeats every 8×8 texels, as shown in FIG. 6. FIG. 6 illustrates specifically positional encoding (pe) tiles of 8×8 texels, where a single texel is represented by 6+6 scalars, each encoding the horizontal and vertical texel position inside the tile, and where the last value is constant in both the horizontal and vertical encoding. It should be noted that while the positional encoding example described herein relates to 2D, the positional encoding can be extended to any finite number of dimensions without loss of generality.

Network

In part d), a neural network is used to decode the mip level illustrated in part e). The network is a simple multi-layer perceptron with two hidden layers, each of size 64 channels. The size of the input is given by $4C_0+C_1+12+1$, where $C_k$ is the size of the feature vector in grid $G_k$. Note that 4× more features are used from grid $G_0$ for learned interpolation, 12 values of positional encoding and a LOD value.

An activation function is not used on the output of the last layer. Activation functions for the three remaining layers may be implemented with a Gaussian Error Linear Unit (GELU). To reduce the computation overhead of GELU functions, an approximation denoted "hardGELU" may be used, which is similar to hard Swish. The variant is given by Equation 1.

$$hardGELU(x) = \begin{cases} 0, & \text{if } x < -\frac{3}{2} \\ x, & \text{if } x > \frac{3}{2} \\ \frac{x}{3}\left(x + \frac{3}{2}\right), & \text{otherwise.} \end{cases} \quad \text{Equation 1}$$

Optimization Procedure and Loss Function

The feature pyramid and the decoder are jointly optimized, using gradient descent with the ADAM optimizer. In an exemplary embodiment, the model is trained for 250 k iterations. This method can use and minimize an arbitrary image loss function. The choice of objective function can be adapted based on the use case and when the application only requires either maintaining color fidelity and preserving high-frequency loss. In an embodiment, the L2 loss may be used as a reasonable compromise, as it also trains robustly and is the simplest and computationally fastest choice.

Exemplary Implementation—Compression, Decompression and Filtering

It should be noted that while the embodiments described herein relate to 2D, these embodiments can be extended to any finite number of dimensions without loss of generality. As outlined in FIG. 5, textures at a given texel are decompressed by sampling the corresponding latent values from a feature pyramid and decoding them using a small MLP network. As also mentioned above, the compressed representation is trained specifically for each texture set. Specializing the compressed representation for each material allows for using smaller decoder networks, resulting in fast optimization (compression) and real-time decompression.

Compression

In one exemplary implementation, practical compression speeds may be achieved by using half-precision tensor core operations in a custom optimization program written in CUDA. All of the network layers may be fused in a single kernel, together with feature grids sampling, loss computations, and the entire backward pass. This allows all network activations to be stored in registers, thus eliminating writes to shared or off-chip memory for intermediate data. Of course, it should be noted that other possible implementations that use different numerical representations (e.g. FP8) are also contemplated.

Batches of eight randomly sampled 256×256 texel crops are processed, selected from the same level of detail. For each batch, a level of detail is randomly chosen proportionally to the mip level's area by sampling from an exponential distribution per Equation 2.

$$LOD = \lceil -\log_{2N} X \rceil \quad \text{Equation 2}$$

where N is the number of dimensions, and where X is drawn from an uniform distribution defined over [0, 1). To mitigate undersampling of low-resolution mip levels, 5% of the batches sample their LOD from a uniform distribution defined over entire range of the mip chain. A high initial learning rate of 0.01 is used for the latent grids, and a lower value of 0.005 for the network weights while cosine annealing is applied, lowering the learning rate to 0 at the end of training. The number of training steps can be adjusted depending on the desired balance between compression speed and quality.

Decompression

Similar to training, the decoder network is accelerated using tensor matrix-multiplication intrinsics at half precision. The textures are decompressed directly in the material evaluation shader by inlining the decoder, which eliminates all memory accesses, except for loading feature vectors and network weights. Inline decompression also simplifies composition with other functions, such as filtering. For example, it is possible to implement high-quality filtering by looping over texels in the filter footprint and decompressing them.

Inlining the network with material shading presents a few challenges for acceleration using matrix-multiplication intrinsics. These intrinsics process data in a cooperative manner, where the tensor storage is interleaved across the threads in a wave. Typically, network inputs are copied into a tensor by writing them to shared memory and then loading them into registers in an interleaved manner using specialized matrix load intrinsics. However, access to shared memory is not available inside ray tracing shaders. Therefore, knowledge of the tensor layout is used to interleave the network inputs in-registers using wave shuffle intrinsics.

Important tensor operations may be implemented in the Slang shading language and the underlying D3D compiler used by Slang may be modified to generate NVVM calls for tensor operations and shuffle intrinsics, which are not currently supported by D3D. Another challenge with tensor core acceleration is that it requires uniform network weights across a thread group. However, this cannot be guaranteed since a separately trained network is used for each material. For example, rays originating from different threads in a warp could intersect different materials. In such scenarios, tensor core acceleration can be enabled by looping the network evaluation over all unique textures in a warp. This leads to increasing execution cost with increasing amounts of divergence. However, modern graphics processing units (GPUs) can tackle this problem by sorting shader executions across multiple waves.

Filtering

Figure 7A:
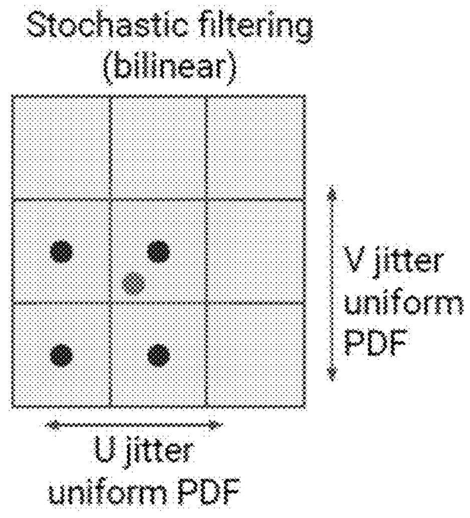
FIG. 7A-7B illustrate different implementations of stochastic filtering during decompression of a compressed texture or compressed texture set, in accordance with various embodiments.
Figure 7B:
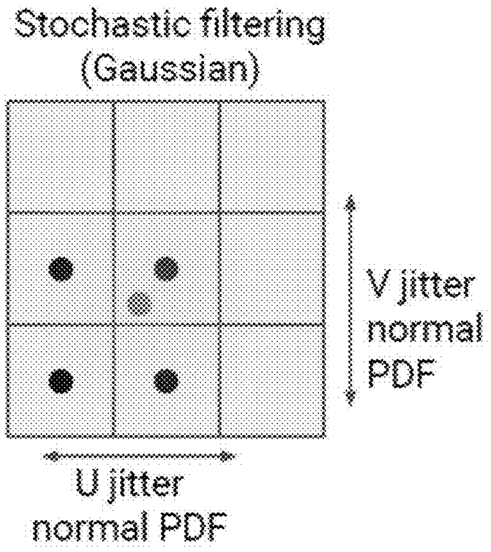

The embodiments disclosed above support mipmapping for discrete levels of minification (see FIG. 3), similar to BCx compression methods. However, hardware acceleration cannot be relied on for trilinear filtering and so in an embodiment it may implemented instead in software on the GPU. The software implementation decompresses and combines four texels for bilinear filtering, and eight texels for trilinear filtering, significantly increasing decompression cost. In order to decouple the decompression cost from filtering, an alternative to trilinear filtering based on stochastic sampling may be used, referred to herein as stochastic filtering. Random noise is added to the (u, v) position, followed by nearest neighbor sampling. Different types of texture filtering can be achieved by changing the distribution of the noise, as shown in FIGS. 7A-7B. For example, a uniform distribution in the range (−0.5, 0.5) of one texel produces bilinear filtering (FIG. 7A), and a normal distribution produces Gaussian filtering (FIG. 7B). In addition to jittering the (u, v) coordinates, the LOD may also be jittered to enable a smooth transition between mip levels.

Stochastic filtering typically increases the amount of noise in the rendered image, but modern post-process reconstruction techniques can effectively suppress this noise. While traditional texture filtering filters the input material properties, stochastic filtering filters the shading output, which produces more accurate results. Details on stochastic filtering are disclosed in Fajardo, Marcos & Wronski, Bartlomiej & Salvi, Marco & Pharr, Matt, (2023), Stochastic Texture Filtering [arXiv:2305.05810v2 [cs.GR]].

Conclusion

The texture compression described herein targets the increasing memory and fidelity requirements of modern computer graphics applications, such as games and architectural visualization, as well as new, richer physically-based shading models that require many more properties, commonly stored in textures. For high-performing texture accesses, random access may or may not be needed. Embodiments of the present disclosure can achieve very high compression rates even without sacrificing local and random access. By compressing many channels and mipmap levels together, the quality the low bitrate results surpasses that of state-of-the-art industry standards without requiring entropy coding.

By utilizing matrix multiplication intrinsics available in the off-the-shelf GPUs, we have shown that decompression of the textures may be possible even for in disk- and memory-constrained graphics applications.

Machine Learning

Deep neural networks (DNNs), including deep learning models, developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 815 for a deep learning or neural learning system are provided below in conjunction with FIGS. 8A and/or 8B.

In at least one embodiment, inference and/or training logic 815 may include, without limitation, a data storage 801 to store forward and/or output weight and/or input/output data corresponding to neurons or layers of a neural network trained and/or used for inferencing in aspects of one or more embodiments. In at least one embodiment data storage 801 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 801 may be included with other on-chip or off-chip data storage, including a processor's L1, L2, or L3 cache or system memory.

In at least one embodiment, any portion of data storage 801 may be internal or external to one or more processors or other hardware logic devices or circuits. In at least one embodiment, data storage 801 may be cache memory, dynamic randomly addressable memory ("DRAM"), static randomly addressable memory ("SRAM"), non-volatile memory (e.g., Flash memory), or other storage. In at least one embodiment, choice of whether data storage 801 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 815 may include, without limitation, a data storage 805 to store backward and/or output weight and/or input/output data corresponding to neurons or layers of a neural network trained and/or used for inferencing in aspects of one or more embodiments. In at least one embodiment, data storage 805 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 805 may be included with other on-chip or off-chip data storage, including a processor's L1, L2, or L3 cache or system memory. In at least one embodiment, any portion of data storage 805 may be internal or external to on one or more processors or other hardware logic devices or circuits. In at least one embodiment, data storage 805 may be cache memory, DRAM, SRAM, non-volatile memory (e.g., Flash memory), or other storage. In at least one embodiment, choice of whether data storage 805 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 801 and data storage 805 may be separate storage structures. In at least one embodiment, data storage 801 and data storage 805 may be same storage structure. In at least one embodiment, data storage 801 and data storage 805 may be partially same storage structure and partially separate storage structures. In at least one embodiment, any portion of data storage 801 and data storage 805 may be included with other on-chip or off-chip data storage, including a processor's L1, L2, or L3 cache or system memory.

In at least one embodiment, inference and/or training logic 815 may include, without limitation, one or more arithmetic logic unit(s) ("ALU(s)") 810 to perform logical and/or mathematical operations based, at least in part on, or indicated by, training and/or inference code, result of which may result in activations (e.g., output values from layers or neurons within a neural network) stored in an activation storage 820 that are functions of input/output and/or weight parameter data stored in data storage 801 and/or data storage 805. In at least one embodiment, activations stored in activation storage 820 are generated according to linear algebraic and or matrix-based mathematics performed by ALU(s) 810 in response to performing instructions or other code, wherein weight values stored in data storage 805 and/or data 801 are used as operands along with other values, such as bias values, gradient information, momentum values, or other parameters or hyperparameters, any or all of which may be stored in data storage 805 or data storage 801 or another storage on or off-chip. In at least one embodiment, ALU(s) 810 are included within one or more processors or other hardware logic devices or circuits, whereas in another embodiment, ALU(s) 810 may be external to a processor or other hardware logic device or circuit that uses them (e.g., a co-processor). In at least one embodiment, ALUs 810 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 801, data storage 805, and activation storage 820 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 820 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 820 may be cache memory, DRAM, SRAM, non-volatile memory (e.g., Flash memory), or other storage. In at least one embodiment, activation storage 820 may be completely or partially within or external to one or more processors or other logical circuits. In at least one embodiment, choice of whether activation storage 820 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 815 illustrated in FIG. 8A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8A may be used in conjunction with central processing unit ("CPU") hardware, graphics processing unit ("GPU") hardware or other hardware, such as field programmable gate arrays ("FPGAs").

Figure 8A:
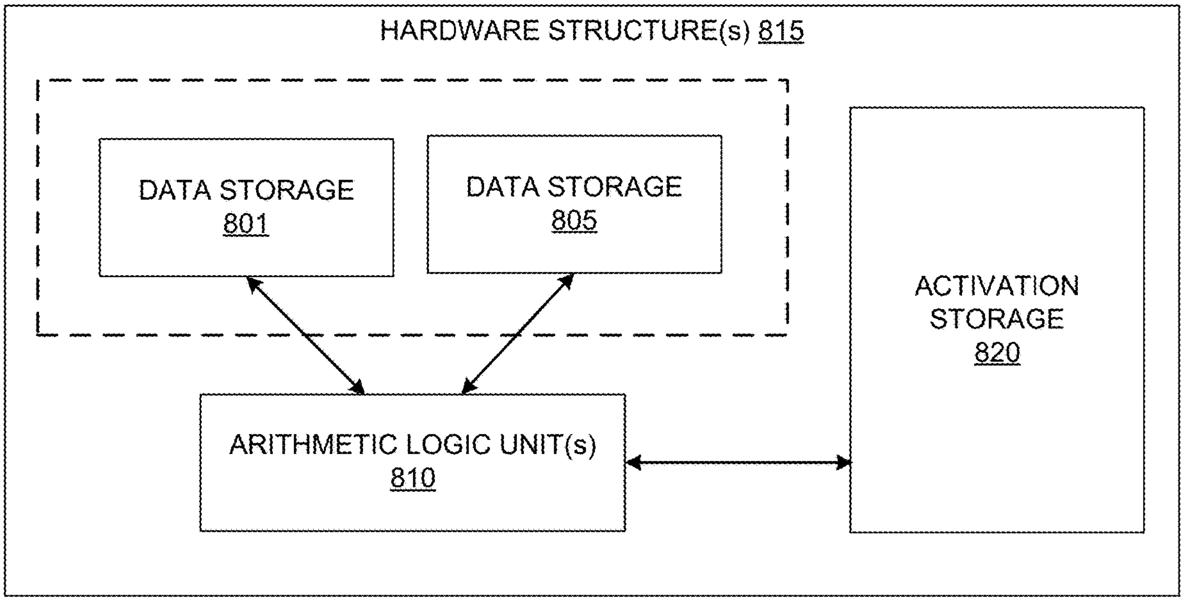
FIG. 8A illustrates inference and/or training logic, according to at least one embodiment.
Figure 8B:
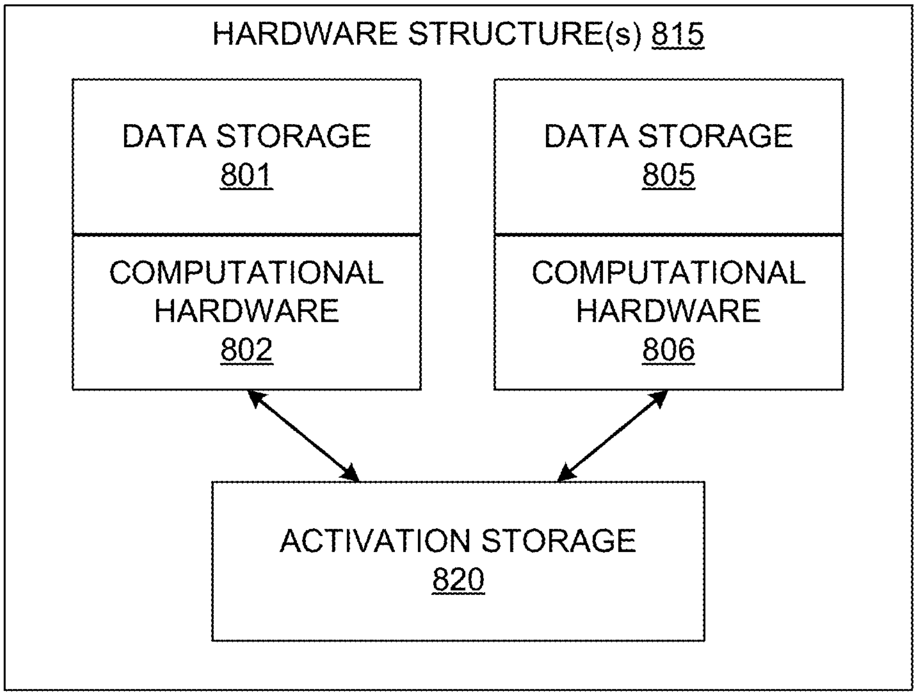
FIG. 8B illustrates inference and/or training logic, according to at least one embodiment.

FIG. 8B illustrates inference and/or training logic 815, according to at least one embodiment. In at least one embodiment, inference and/or training logic 815 may include, without limitation, hardware logic in which computational resources are dedicated or otherwise exclusively used in conjunction with weight values or other information corresponding to one or more layers of neurons within a neural network. In at least one embodiment, inference and/or training logic 815 illustrated in FIG. 8B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 815 illustrated in FIG. 8B may be used in conjunction with central processing unit (CPU) hardware, graphics processing unit (GPU) hardware or other hardware, such as field programmable gate arrays (FPGAs). In at least one embodiment, inference and/or training logic 815 includes, without limitation, data storage 801 and data storage 805, which may be used to store weight values and/or other information, including bias values, gradient information, momentum values, and/or other parameter or hyperparameter information. In at least one embodiment illustrated in FIG. 8B, each of data storage 801 and data storage 805 is associated with a dedicated computational resource, such as computational hardware 802 and computational hardware 806, respectively. In at least one embodiment, each of computational hardware 806 comprises one or more ALUs that perform mathematical functions, such as linear algebraic functions, only on information stored in data storage 801 and data storage 805, respectively, result of which is stored in activation storage 820.

In at least one embodiment, each of data storage 801 and 805 and corresponding computational hardware 802 and 806, respectively, correspond to different layers of a neural network, such that resulting activation from one "storage/computational pair 801/802" of data storage 801 and computational hardware 802 is provided as an input to next "storage/computational pair 805/806" of data storage 805 and computational hardware 806, in order to mirror conceptual organization of a neural network. In at least one embodiment, each of storage/computational pairs 801/802 and 805/806 may correspond to more than one neural network layer. In at least one embodiment, additional storage/computation pairs (not shown) subsequent to or in parallel with storage computation pairs 801/802 and 805/806 may be included in inference and/or training logic 815.

Neural Network Training and Deployment

Figure 9:
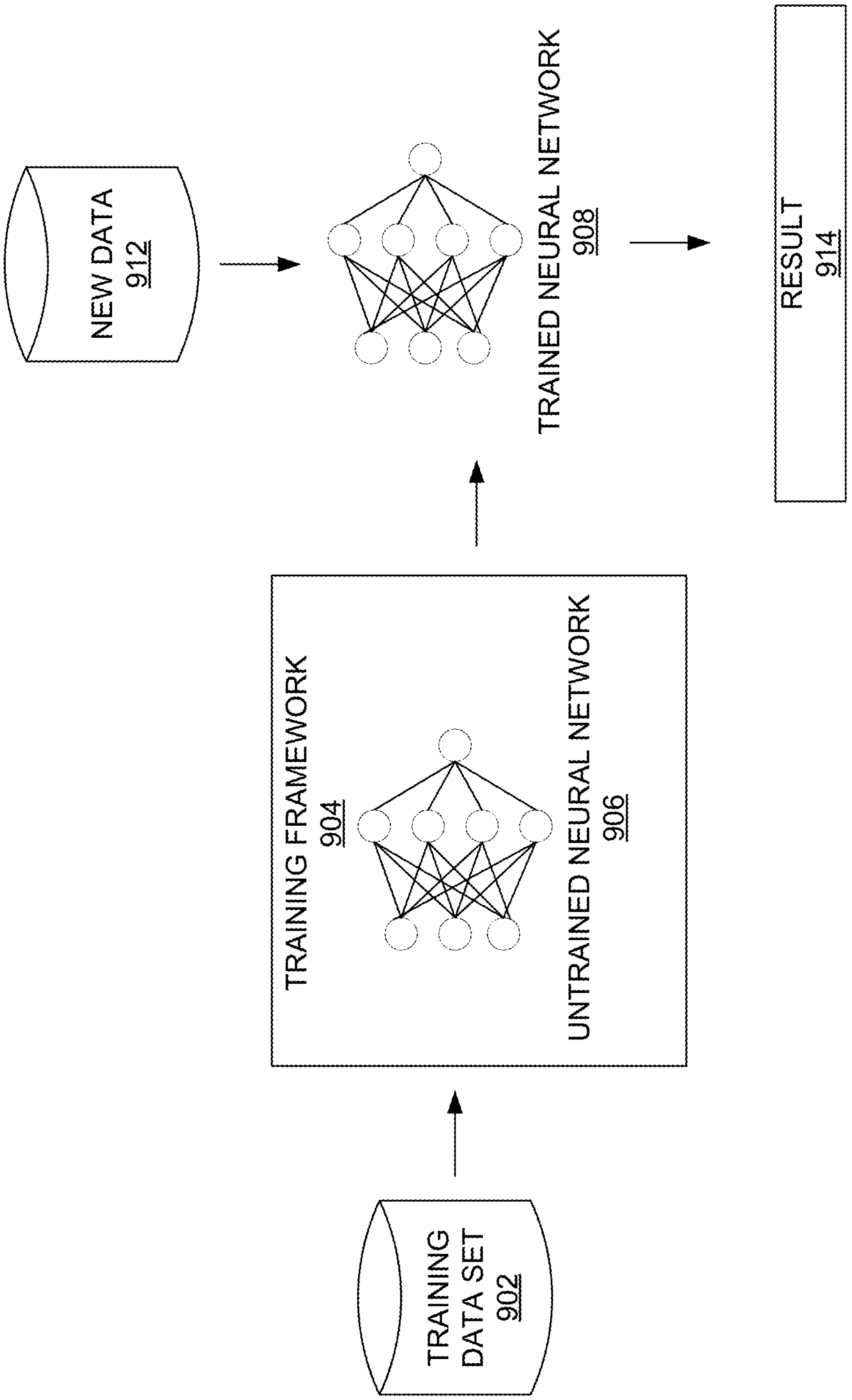
FIG. 9 illustrates training and deployment of a neural network, according to at least one embodiment.

FIG. 9 illustrates another embodiment for training and deployment of a deep neural network. In at least one embodiment, untrained neural network 906 is trained using a training dataset 902. In at least one embodiment, training framework 904 is a PyTorch framework, whereas in other embodiments, training framework 904 is a Tensorflow, Boost, Caffe, Microsoft Cognitive Toolkit/CNTK, MXNet, Chainer, Keras, Deeplearning4j, or other training framework. In at least one embodiment training framework 904 trains an untrained neural network 906 and enables it to be trained using processing resources described herein to generate a trained neural network 908. In at least one embodiment, weights may be chosen randomly or by pre-training using a deep belief network. In at least one embodiment, training may be performed in either a supervised, partially supervised, or unsupervised manner.

In at least one embodiment, untrained neural network 906 is trained using supervised learning, wherein training dataset 902 includes an input paired with a desired output for an input, or where training dataset 902 includes input having known output and the output of the neural network is manually graded. In at least one embodiment, untrained neural network 906 is trained in a supervised manner processes inputs from training dataset 902 and compares resulting outputs against a set of expected or desired outputs. In at least one embodiment, errors are then propagated back through untrained neural network 906. In at least one embodiment, training framework 904 adjusts weights that control untrained neural network 906. In at least one embodiment, training framework 904 includes tools to monitor how well untrained neural network 906 is converging towards a model, such as trained neural network 908, suitable to generating correct answers, such as in result 914, based on known input data, such as new data 912. In at least one embodiment, training framework 904 trains untrained neural network 906 repeatedly while adjust weights to refine an output of untrained neural network 906 using a loss function and adjustment algorithm, such as stochastic gradient descent. In at least one embodiment, training framework 904 trains untrained neural network 906 until untrained neural network 906 achieves a desired accuracy. In at least one embodiment, trained neural network 908 can then be deployed to implement any number of machine learning operations.

In at least one embodiment, untrained neural network 906 is trained using unsupervised learning, wherein untrained neural network 906 attempts to train itself using unlabeled data. In at least one embodiment, unsupervised learning training dataset 902 will include input data without any associated output data or "ground truth" data. In at least one embodiment, untrained neural network 906 can learn groupings within training dataset 902 and can determine how individual inputs are related to untrained dataset 902. In at least one embodiment, unsupervised training can be used to generate a self-organizing map, which is a type of trained neural network 908 capable of performing operations useful in reducing dimensionality of new data 912. In at least one embodiment, unsupervised training can also be used to perform anomaly detection, which allows identification of data points in a new dataset 912 that deviate from normal patterns of new dataset 912.

In at least one embodiment, semi-supervised learning may be used, which is a technique in which in training dataset 902 includes a mix of labeled and unlabeled data. In at least one embodiment, training framework 904 may be used to perform incremental learning, such as through transferred learning techniques. In at least one embodiment, incremental learning enables trained neural network 908 to adapt to new data 912 without forgetting knowledge instilled within network during initial training.

Data Center

Figure 10:
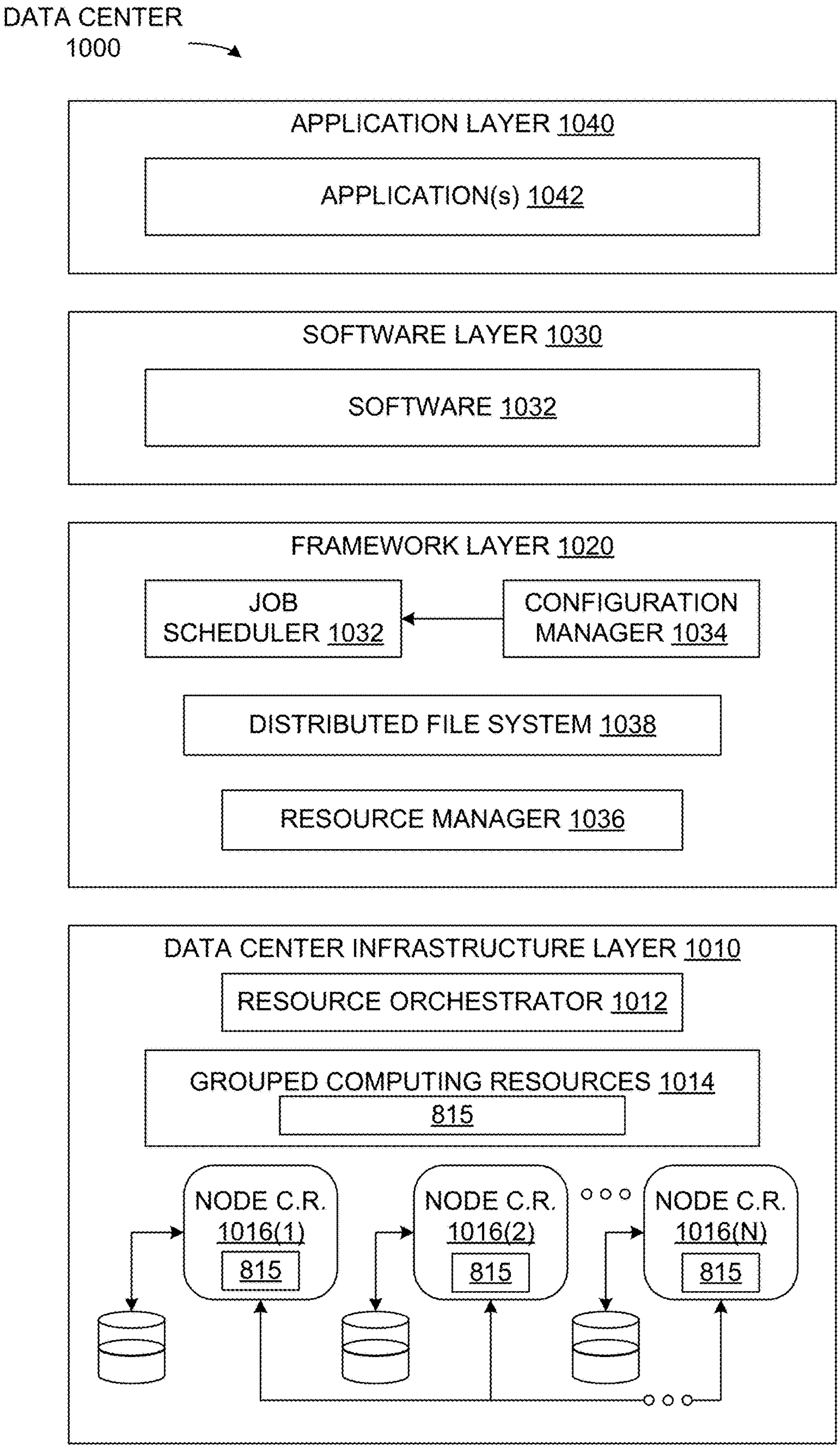
FIG. 10 illustrates an example data center system, according to at least one embodiment.

FIG. 10 illustrates an example data center 1000, in which at least one embodiment may be used. In at least one embodiment, data center 1000 includes a data center infrastructure layer 1010, a framework layer 1020, a software layer 1030 and an application layer 1040.

In at least one embodiment, as shown in FIG. 10, data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1016(1)-1016(N) may be a server having one or more of above-mentioned computing resources.

In at least one embodiment, grouped computing resources 1014 may include separate groupings of node C.R.s housed within one or more racks (not shown), or many racks housed in data centers at various geographical locations (also not shown). Separate groupings of node C.R.s within grouped computing resources 1014 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1022 may configure or otherwise control one or more node C.R.s 1016(1)-1016(N) and/or grouped computing resources 1014. In at least one embodiment, resource orchestrator 1022 may include a software design infrastructure ("SDI") management entity for data center 1000. In at least one embodiment, resource orchestrator may include hardware, software or some combination thereof.

In at least one embodiment, as shown in FIG. 10, framework layer 1020 includes a job scheduler 1032, a configuration manager 1034, a resource manager 1036 and a distributed file system 1038. In at least one embodiment, framework layer 1020 may include a framework to support software 1032 of software layer 1030 and/or one or more application(s) 1042 of application layer 1040. In at least one embodiment, software 1032 or application(s) 1042 may respectively include web-based service software or applications, such as those provided by Amazon Web Services, Google Cloud and Microsoft Azure. In at least one embodiment, framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. In at least one embodiment, configuration manager 1034 may be capable of configuring different layers such as software layer 1030 and framework layer 1020 including Spark and distributed file system 1038 for supporting large-scale data processing. In at least one embodiment, resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. In at least one embodiment, resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. one or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. In at least one embodiment, self-modifying actions may relieve a data center operator of data center 1000 from making possibly bad configuration decisions and possibly avoiding underutilized and/or poor performing portions of a data center.

In at least one embodiment, data center 1000 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1000. In at least one embodiment, trained machine learning models corresponding to one or more neural networks may be used to infer or predict information using resources described above with respect to data center 1000 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 815 are used to perform inferencing and/or training operations associated with one or more embodiments. In at least one embodiment, inference and/or training logic 815 may be used in system FIG. 10 for inferencing or predicting operations based, at least in part, on weight parameters calculated using neural network training operations, neural network functions and/or architectures, or neural network use cases described herein.

As described herein, a method, computer readable medium, and system are disclosed to provide for compression of a single texture or multiple textures together using a non-linear function that exploits correlations across mip levels. In accordance with FIGS. 1-7B, embodiments may provide a neural network usable for texture compression, involving the performance of inferencing operations and for providing inferenced data. The neural network may be stored (partially or wholly) in one or both of data storage 801 and 805 in inference and/or training logic 815 as depicted in FIGS. 8A and 8B. Training and deployment of the neural network may be performed as depicted in FIG. 9 and described herein. Distribution of the neural network may be performed using one or more servers in a data center 1000 as depicted in FIG. 10 and described herein.

What is claimed is:

1. A method, comprising:

at a device:

compressing together a plurality of textures in a set of textures, using a non-linear function and quantization, to form a compressed representation of the set of textures, wherein the compressed representation is a pyramid of a plurality of feature levels, wherein each feature level of the plurality of feature levels includes a plurality of grids, wherein each feature level of the plurality of feature levels includes two grids, wherein a first one of two grids is at a higher resolution than a second one of the two grids; and outputting the compressed representation of the set of textures.

2. The method of claim 1, wherein the set of textures represents a material.

3. The method of claim 2, wherein each texture of the plurality of textures represents a different property of the material.

4. The method of claim 1, wherein at least one texture of the plurality of textures includes a plurality of channels.

5. The method of claim 1, wherein compressing together the plurality of textures includes exploiting correlations across the plurality of textures.

6. The method of claim 1, wherein compressing together the plurality of textures includes exploiting correlations across a plurality of channels of the plurality of textures.

7. The method of claim 1, wherein the non-linear function exploits correlations spatially across each texture in the set of textures.

8. The method of claim 1, wherein the non-linear function exploits correlations across mip levels.

9. The method of claim 1, wherein the non-linear function is a neural network.

10. The method of claim 1, wherein the grids store data that can be used during texture decompression to unpack at least a portion of an image.

11. The method of claim 1, wherein a resolution of the grids is less than a resolution of the plurality of textures in the set of textures.

12. The method of claim 1, wherein cells of the plurality of grids store feature vectors of quantized latent values.

13. The method of claim 1, wherein the non-linear function learns a compressed representation of the set of textures individually.

14. The method of claim 13, wherein the non-linear function is a decoder that utilizes a multi-layer perceptron (MLP).

15. The method of claim 14, wherein the compressed representation is learned together with weights of the MLP.

16. The method of claim 15, wherein the compressed representation is optimized through quantization-aware training and backpropagation through the decoder.

17. The method of claim 1, wherein the quantization reduces a bit count.

18. The method of claim 1, wherein the compressed representation of the set of textures is output to storage.

19. The method of claim 1, wherein the compressed representation of the set of textures is output to a remote computing device for use in rendering an image.

20. A method, comprising:

at a device:

compressing together a plurality of textures in a set of textures, using a non-linear function and quantization, to form a compressed representation of the set of textures, wherein the compressed representation is a pyramid of a plurality of feature levels, wherein each feature level of the plurality of feature levels includes a plurality of grids, wherein a resolution of the grids is reduced across the plurality of feature levels, from a top feature level of the pyramid to a bottom feature level of the pyramid; and outputting the compressed representation of the set of textures.

21. A method, comprising:

at a device:

compressing together a plurality of textures in a set of textures, using a non-linear function and quantization, to form a compressed representation of the set of textures, wherein the compressed representation is a pyramid of a plurality of feature levels, wherein each feature level of the plurality of feature levels includes a plurality of grids, wherein each feature level of the plurality of feature levels represents a plurality of mip levels; and outputting the compressed representation of the set of textures.

22. A system, comprising:

a non-transitory memory storage comprising instructions; and one or more processors in communication with the memory, wherein the one or more processors execute the instructions to:

compress together a plurality of textures in a set of textures, using a non-linear function and quantization to form a compressed representation of the set of textures, wherein the compressed representation is a pyramid of a plurality of feature levels, wherein each feature level of the plurality of feature levels includes a plurality of grids, wherein a resolution of the grids is reduced across the plurality of feature levels, from a top feature level of the pyramid to a bottom feature level of the pyramid; and output the compressed representation of the set of textures.

23. The system of claim 22, wherein compressing together the plurality of textures includes exploiting correlations across the plurality of textures.

24. The system of claim 22, wherein compressing together the plurality of textures together includes exploiting correlations across a plurality of channels of the plurality of textures.

25. The system of claim 22, wherein the non-linear function exploits correlations spatially across each texture in the set of textures.

26. The system of claim 22, wherein the non-linear function exploits correlations across mip levels.

27. The system of claim 22, wherein the compressed representation of the set of textures is output to storage.

28. The system of claim 27, wherein the storage is local to the system.

29. The system of claim 27, wherein the storage is remote from the system.

30. The system of claim 22, wherein the compressed representation of the set of textures is output to a remote system for use in rendering an image.

31. A non-transitory computer-readable media storing computer instructions which when executed by one or more processors of a device cause the device to:

compress together a plurality of textures in a set of textures, using a non-linear function and quantization to form a compressed representation of the set of textures, wherein the compressed representation is a pyramid of a plurality of feature levels, wherein each feature level of the plurality of feature levels includes a plurality of grids, wherein a resolution of the grids is reduced across the plurality of feature levels, from a top feature level of the pyramid to a bottom feature level of the pyramid; and output the compressed representation of the set of textures.

32. The non-transitory computer-readable media of claim 31, wherein compressing together the plurality of textures includes exploiting correlations across the plurality of textures.

33. The non-transitory computer-readable media of claim 31, wherein compressing together the plurality of textures together includes exploiting correlations across a plurality of channels of the plurality of textures.

34. The non-transitory computer-readable media of claim 31, wherein the non-linear function exploits correlations spatially across each texture in the set of textures.

35. The non-transitory computer-readable media of claim 31, wherein the non-linear function exploits correlations across mip levels.

36. A method, comprising:

at a device:

determining a defined number of quantization levels; and learning a scalar or vector quantization of a compressed representation of a plurality of textures in a set of textures, based on the defined number of quantization levels, wherein the compressed representation is a pyramid of a plurality of feature levels, wherein each feature level of the plurality of feature levels includes a plurality of grids, wherein a resolution of the grids is reduced across the plurality of feature levels, from a top feature level of the pyramid to a bottom feature level of the pyramid.

37. The method of claim 36, wherein the grids store data that can be used during texture decompression to unpack at least a portion of an image.

38. The method of claim 36, wherein each feature level of the plurality of feature levels includes two grids.

39. The method of claim 36, wherein a resolution of the grids is less than a resolution of the plurality of textures in the set of textures.

40. The method of claim 36, wherein cells of the plurality of grids store feature vectors of quantized latent values.

41. A method, comprising:

at a device:

determining a defined number of quantization levels; and learning a scalar or vector quantization of a compressed representation of a plurality of textures in a set of textures, based on the defined number of quantization levels, wherein the compressed representation is a pyramid of a plurality of feature levels, wherein each feature level of the plurality of feature levels includes a plurality of grids, wherein each feature level of the plurality of feature levels represents a plurality of mip levels.

42. A method, comprising:

at a device:

determining a defined number of quantization levels; and learning a scalar or vector quantization of a compressed representation of a plurality of textures in a set of textures, based on the defined number of quantization levels, wherein the compressed representation is a pyramid of a plurality of feature levels, wherein each feature level of the plurality of feature levels includes a plurality of grids, wherein each feature level of the plurality of feature levels includes two grids, wherein a first one of two grids is at a higher resolution than a second one of the two grids.

* * * * *